United States Patent
Lim (10) Patent No.: US 9,864,862 B2
(45) Date of Patent: Jan. 9, 2018

(54) DATA CONCEALMENT APPARATUS AND METHOD USING AN ERROR CORRECTION CODE

(71) Applicant: DONGGUK UNIVERSITY INDUSTRY-ACADEMIC COOPERATION FOUNDATION, Seoul (KR)

(72) Inventor: Daewoon Lim, Seoul (KR)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 174 days.

(21) Appl. No.: 14/931,858

(22) Filed: Nov. 4, 2015

(65) Prior Publication Data
US 2016/0140346 A1 May 19, 2016

(30) Foreign Application Priority Data
Nov. 14, 2014 (KR) .......................... 10-2014-0159225

(51) Int. Cl.
| | |
|---|---|
| *H04L 29/06* | (2006.01) |
| *G06F 21/60* | (2013.01) |
| *H04L 1/00* | (2006.01) |
| *H04N 19/467* | (2014.01) |

(52) U.S. Cl.
CPC ............ *G06F 21/60* (2013.01); *H04L 1/0041* (2013.01); *H04L 1/0059* (2013.01); *H04N 19/467* (2014.11)

(58) Field of Classification Search
CPC ....... H04L 63/00; G06F 21/60; G06K 9/6219; G06T 1/00; H04N 1/419
See application file for complete search history.

(56) References Cited

U.S. PATENT DOCUMENTS

| | | | |
|---|---|---|---|
| 6,580,804 B1 | 6/2003 | Abe | |
| 8,488,837 B2 | 7/2013 | Bae et al. | |
| 8,565,472 B2 | 10/2013 | Rzeszewski et al. | |
| 2005/0141747 A1* | 6/2005 | Shi ........................ | G06T 1/0028 382/100 |

FOREIGN PATENT DOCUMENTS

| | | |
|---|---|---|
| KR | 10-2007-0115760 A | 12/2007 |
| KR | 10-2012-0068084 A | 6/2012 |
| KR | 10-2013-0087294 A | 8/2013 |
| KR | 10-1354609 B1 | 1/2014 |

* cited by examiner

*Primary Examiner* — Joseph P Hirl
*Assistant Examiner* — Leynna Truvan
(74) *Attorney, Agent, or Firm* — Park, Kim & Suh, LLC

(57) ABSTRACT

Disclosed are a data concealment apparatus and a data concealment method using an Error Correction Code. According to exemplary embodiments of the present invention, it is possible to prevent important information from being easily exposed to a third person by generating encoding data through convolution encoding of input data and thereafter, concealing the encoding data on an image through adjustment of a pixel value on the image and minimize an error which can occur at the time of recovering the input data by extracting the encoding data from the image in a soft decision scheme and performing Viterbi-decoding on the extracted encoding data in order to recover the input data concealed in the image.

8 Claims, 5 Drawing Sheets

DATA CONCEALMENT APPARATUS AND METHOD USING AN ERROR CORRECTION CODE

CROSS-REFERENCE TO RELATED APPLICATIONS

This application claims priority to and the benefit of Korean Patent Application No. 10-2014-0159225 filed in the Korean Intellectual Property Office on Nov. 14, 2014, the entire contents of which are incorporated herein by reference.

TECHNICAL FIELD

The present invention relate to technologies regarding a technique that conceals data on an image in order to prevent information from being exposed and recovers the data concealed on the image.

BACKGROUND ART

In recent years, as various types of information has been generated and distributed, damage such as exposure of important information to a third person has occurred due to hacking or information transfer through a wrong path.

In particular, while no defense mechanism is applied to important information such as military information or personal information during transferring the information, when the important information is accidentally transferred to the third person, the third person can easily access the important information, and as a result, costly damage can occur.

In recent years, in order to prevent the important information from being exposed, a technique has been introduced, which encrypts the important information by using a predetermined encryption key and thereafter, transfers the encrypted important information to a counterpart.

However, since such a scheme encrypts the important information itself, the third person can easily recognize whether the corresponding information is the important information, the important information can be easily exposed to the third person.

Although the important information is encrypted, when the important information itself can be easily exposed to the third person, a problem occurs in terms of security, and as a result, a scheme has been introduced, which transfers the important information while concealing the important information on a predetermined image in recent years in order to reduce an exposure possibility of the important information itself.

When the important information is concealed on the image, the security can be more strengthened as compared with the scheme that encrypts the important information itself in the related art in that it is difficult for the third person to easily recognize whether the important information is concealed on the corresponding image.

Accordingly, research into a more advanced data concealment technique for preventing the important information from being easily exposed to the third person is required according to such a technical stream.

SUMMARY OF THE INVENTION

The present invention have been made in an effort to prevent important information from being easily exposed to a third person by generating encoding data through convolution encoding of input data and thereafter, concealing the encoding data on an image through adjustment of a pixel value on the image and minimize an error which can occur at the time of recovering the input data by extracting the encoding data from the image in a soft decision scheme and performing Viterbi-decoding on the extracted encoding data in order to recover the input data concealed in the image.

An exemplary embodiment of the present invention provides a data concealment apparatus using an error correction code, including: a data encoding unit convolution-encoding input data to be concealed on an image to generate encoding data; a block dividing unit dividing the image into one or more image blocks to correspond to the number of bits of the encoding data; and a concealment unit concealing the encoding data one bit by one bit with respect to one or more respective image blocks by performing a change of a pixel value based on a predetermined pixel value change pattern according to respective bit values constituting a bitstream of the encoding data for each of one or more image blocks.

Another exemplary embodiment of the present invention provides a data concealment method using an error correction code, including: convolution-encoding input data to be concealed on an image to generate encoding data; dividing the image into one or more image blocks to correspond to the number of bits of the encoding data; and concealing the encoding data one bit by one bit with respect to one or more respective image blocks by performing a change of a pixel value based on a predetermined pixel value change pattern according to respective bit values constituting a bitstream of the encoding data for each of one or more image blocks.

According to exemplary embodiments of the present invention, it is possible to prevent important information from being easily exposed to a third person by generating encoding data through convolution encoding of input data and thereafter, concealing the encoding data on an image through adjustment of a pixel value on the image and minimize an error which can occur at the time of recovering the input data by extracting the encoding data from the image in a soft decision scheme and performing Viterbi-decoding on the extracted encoding data in order to recover the input data concealed in the image.

DETAILED DESCRIPTION

The present invention may have various modifications and various embodiments and specific exemplary embodiments will be illustrated in the drawings and described in detail in the detailed description. However, this does not limit the present invention within specific exemplary embodiments, and it should be understood that the present invention covers all the modifications, equivalents and replacements within the idea and technical scope of the present invention. In describing each drawing, like reference numerals refer to like elements.

It should be understood that, when it is described that an element is "connected" or "access" another element, the element may be directly connect to or access the another element or a third element may be present therebetween. In contrast, it should be understood that, when it is described that an element "is directly connected to" or "directly accesses" another element, it is understood that no element is not present between the element and the another element.

Terms used in the present application are used only to describe specific exemplary embodiments, and are not intended to limit the present invention. Singular expressions used herein include plurals expressions unless they have definitely opposite meanings in the context. In the present application, it should be understood that term "include" indicates that a feature, a number, a step, an operation, a component, a part or the combination thereof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present application.

Hereafter, exemplary embodiments of the present invention will be described in detail with reference to the accompanying drawings.

Figure 1:
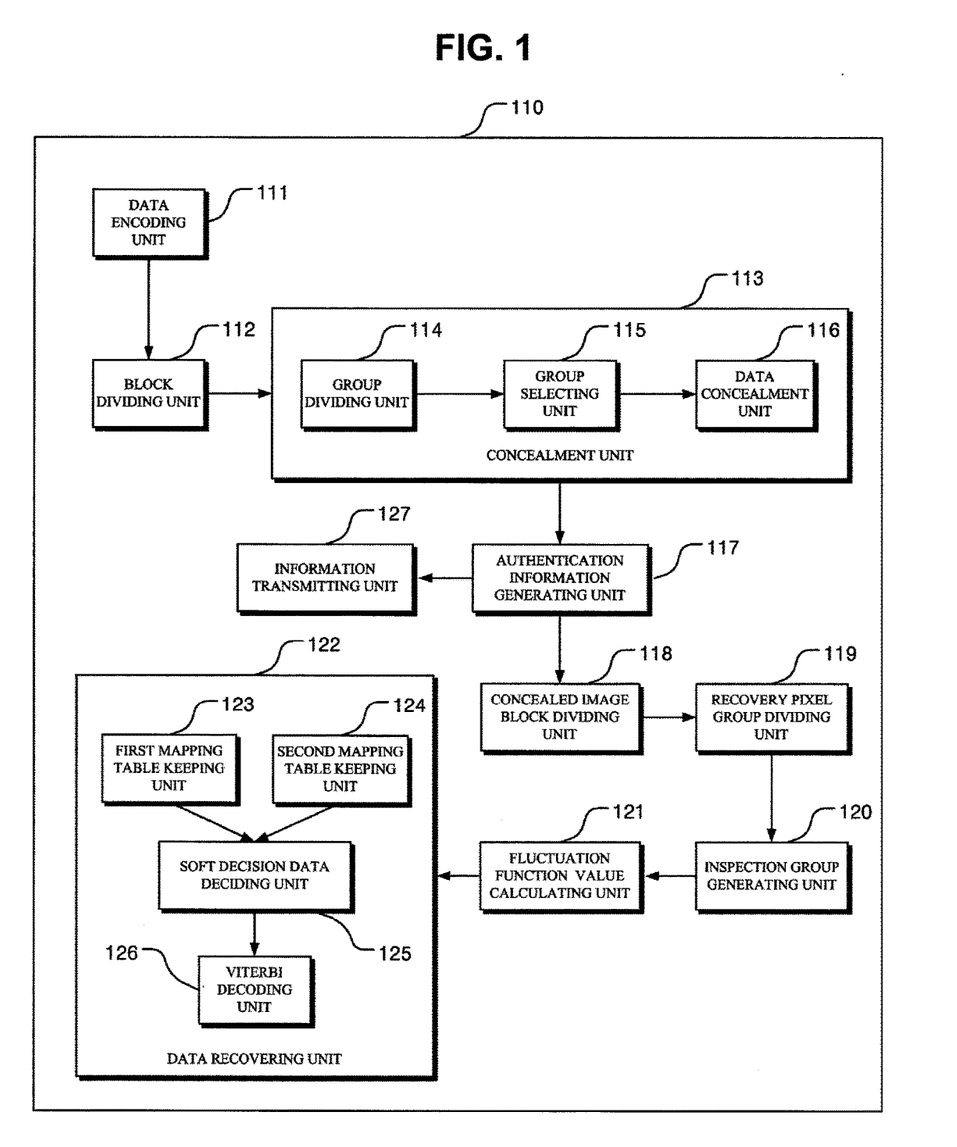
FIG. 1 is a diagram illustrating a structure of a data concealment apparatus using an error correction code according to an exemplary embodiment of the present invention.

FIG. 1 is a diagram illustrating a structure of a data concealment apparatus using an error correction code according to an exemplary embodiment of the present invention.

Referring to FIG. 1, the data concealment apparatus 110 using an error correction code according to the exemplary embodiment of the present invention includes a data encoding unit 111, a block dividing unit 112, and a concealment unit 113.

Hereinafter, referring to FIG. 2, an operation of the data concealment apparatus 110 using an error correction code will be described in detail.

First, in the exemplary embodiment of FIG. 2, the present invention will be described on the assumption that input data of 2 bits such as '10' is concealed on an image. First, the data encoding unit 111 may generate encoding data by performing convolution encoding of the input data '10' to be concealed on an image 211 in order to conceal the input data on the image 211 represented by reference numeral 210.

Herein, the convolution encoding is a kind of channel encoding scheme for inducing a receiving side to correct an error of received data in that an error may occur in the data received by the receiving side due to an error on a transmission channel while a transmitting side transmits data to the receiving side in a communication system.

The convolution encoding as an encoding technique having memoriality unlike block encoding is an encoding technique in which input data is encoded in a manner that some past signals are together used for a current input signal to increase error correction efficiency at the time of decoding the encoded data afterwards.

In general, when the transmitting side performs the convolution encoding of data and thereafter, transmits the data to the receiving side, the receiving side performs Viterbi-decoding in order to decode the encoding data received through a communication channel to acquire the data transmitted by the transmitting side.

In this case, the receiving side predicts the encoding data received by the receiving side based on a size value of the data received through the communication channel, calculates branch metric based on the predicted encoding data, and decodes the encoding data to acquire actual data transmitted by the transmitting side while performing the Viterbi-decoding.

In this case, in order to perform the Viterbi-decoding, a method in which the receiving side predicts the encoding data received by the receiving side includes a hard decision scheme that just predicts a bit value of the received data as '0' and '1' according to a size value of data received through the communication channel and a soft decision scheme that does not just predict the bit value of the received data as '0' and '1' according to the size value of the data received through the communication channel but predicts the bit value of the received data by introducing a probabilistic concept regarding whether a probability that the bit value of the received data will be '0' is high or a probability that the bit value of the received data will be '1' is high according to a change in size of the data received by the receiving side.

When the receiving side predicts the bit value of the received data by applying the hard decision scheme, on the assumption that the transmitting side transmits encoding data '100111', the receiving side predicts data of 6 bits by performing the hard decision for deciding whether the bit value of the received data is '0' or '1' according to the size value of the data received by the receiving side 6 times.

However, in that the hard decision scheme is a scheme that determines that the received data is '0' or '1' according to the size value of the data received by the receiving side, when the hard decision scheme cannot determine that the size of the data received by the receiving side is '0' or '1' due to the error on the communication channel, the receiving side may predict wrong received data.

As a result, when the receiving side calculates the branch metric based on the received data decided through the hard decision, a probability that an error will occur while decoding the actual data transmitted by the transmitting side may be high.

Accordingly, in order to decrease the error occurrence possibility while acquiring the actual data transmitted by the transmitting side by receiving the data by the receiving side, the receiving side may keep a mapping table in which a predetermined bit number of predetermined soft decision data depending on a change in size of the data received by the receiving side is recorded and decide the soft decision data corresponding to the size value of the data received by the receiving side by referring to the mapping table.

For example, on the assumption that the predetermined bit number is 3 and the transmitting side transmits the encoding data '100111', the receiving side may perform a process that does not decide the bit value of the received data as '0' or '1' according to the size value of the data received by the receiving side, but decides the soft decision data of 3 bits corresponding to the size value of the received data by referring to the mapping table a total of 6 times.

As such, when the soft decision data is decided, the receiving side calculates the branch metric based on the soft decision data to complete decoding the actual data transmitted by the transmitting side.

As such, when the data encoding unit 111 generates the encoding data by completing the convolution encoding of the input data '10', the block dividing unit 112 divides the image 211 into one or more image blocks 221, 222, 223, and 224 as represented by reference numeral 220 to correspond to the bit number of the encoding data.

Herein, the block dividing unit 112 may set the number of one or more image blocks 221, 222, 223, and 224 to correspond to the bit number of the encoding data.

In this regard, it is assumed that the data encoding unit 111 performs convolution encoding having a ½ rate with respect to the input data '10' to generate the encoding data '1110'.

In this case, since the encoding data '1110' is 4-bit data, the block dividing unit 112 may divide the image 211 into four image blocks of image block 1 221, image block 2 222, image block 3 223, and image block 4 224 as represented by reference numeral 220.

As such, when the image 211 is divided into one or more image blocks 221, 222, 223, and 224 to be completed, the concealment unit 113 performs a change in pixel value based a predetermined pixel value change pattern according to respective bit values constituting a bitstream of the encoding data for each of one or more image blocks 221, 222, 223, and 224 to conceal the encoding data for each of one or more image blocks 221, 222, 223, and 224 1 bit by 1 bit.

In this case, according to the exemplary embodiment of the present invention, the concealment unit 113 may include a group dividing unit 114, a group selecting unit 115, and a data concealing unit 116.

The group dividing unit 114 divides pixels included in one or more image blocks 221, 222, 223, and 224, respectively into a first pixel group 231 and a second pixel group 232 with respect to one or more respective image blocks 221, 222, 223, and 224.

In this regard, the group dividing unit 114 divides pixels processed by a shadow into the first pixel group 231 and pixels not processed by the shadow into the second pixel group 232 as represented by reference numeral 230 with respect to one or more respective image blocks 221, 222, 223, and 224.

The dividing scheme of the group dividing unit 114 into the first pixel group 231 and the second pixel group 232 may be arbitrarily decided by a user.

The group selecting unit 115 selects a pixel group to be used for data concealment of the first pixel group 231 and the second pixel group 232 with respect to one or more respective image blocks 221, 222, 223, and 224 based on the bit values of the encoding data to be concealed in one or more respective image blocks 221, 222, 223, and 224.

For example, when the encoding data '1110' is sequentially concealed in one or more respective image blocks 221, 222, 223, and 224 one bit by one bit, that is, when a bit value '1' in the encoding data '1110' is concealed in image block 1 221 of one or more image blocks 221, 222, 223, and 224, the bit value '1' is concealed in image block 2 222, the bit value '1' is concealed in image block 3 223, and the bit value '0' is concealed in image block 4 224, the group selecting unit 115 may select the pixel group to be used for data concealment of the first pixel group 231 and the second pixel group 232 with respect to one or more image blocks 221, 222, 223, and 224 based on the bit values of the encoding data to be concealed in one or more respective image blocks 221, 222, 223, and 224.

The selection scheme of the pixel group by the group selecting unit 115 may be arbitrarily set by the user. That is, when a data bit value to be concealed on a specific image block of one or more image blocks 221, 222, 223, and 224 is '0', the group selecting unit 115 may be set to select the second pixel group 232 as a pixel group for concealing data having the bit value '0' of the first pixel group 231 and the second pixel group 232 and when the bit value of the data to be concealed on the specific image block of one or more image blocks 221, 222, 223, and 224 is '1', the group selecting unit 115 may be set to select the first pixel group 231 as a pixel group for concealing data having the bit value '1' of the first pixel group 231 and the second pixel group 232.

In the exemplary embodiment, it is assumed that when the data bit value to be concealed on a specific image block of one or more image blocks 221, 222, 223, and 224 is '1', the group selecting unit 115 may be set to select the first pixel group 231 as the pixel group for concealing data having the bit value '1' of the first pixel group 231 and the second pixel group 232 and when the bit value of the data to be concealed on the specific image block of one or more image blocks 221, 222, 223, and 224 is '0', the group selecting unit 115 may be set to select the second pixel group 232 as the pixel group for concealing data having the bit value '0' of the first pixel group 231 and the second pixel group 232.

In this case, since the bit value '1' is concealed with respect to image block 1 221, the group selecting unit 115 may select the first pixel group 231 with respect to image block 1 221, since the bit value '1' is concealed with respect to image block 2 222, the group selecting unit 115 may select the first pixel group 231 with respect to image block 2 222, since the bit value '1' is concealed with respect to image block 3 223, the group selecting unit 115 may select the first pixel group 231 with respect to image block 3 223, and since the bit value '0' is concealed with respect to image block 4 224, the group selecting unit 115 may select the second pixel group 232 with respect to image block 4 224.

As such, when selection of the pixel group is completed with respect to one or more respective image blocks 221, 222, 223, and 224, the data concealment unit 116 conceals the encoding data with respect to one or more respective image blocks 221, 222, 223, and 224 one bit by one bit by changing pixel values of pixels included in the pixel group selected with respect to one or more respective image blocks 221, 222, 223, and 224 according to the predetermined pixel value change pattern.

In this case, according to the exemplary embodiment of the present invention, the predetermined pixel value change pattern may be a pattern that converts into an inverse value at least one bit value which exists at a predetermined location in a bitstream constituting pixel values of pixels included in the selected pixel group.

In this regard in the exemplary embodiment, it is assumed that the predetermined pixel value change pattern is a pattern that converts into inverse values the last three bit values in the bitstream constituting the pixel values of pixels included in the selected pixel group. For example, it is assumed that the predetermined pixel value change pattern is a pattern in which in the case where a data bitstream of a specific pixel value is '11110000', when the pixel value is changed by applying the predetermined pixel value change pattern to the specific pixel value, the data bitstream of the specific pixel value is changed to '11110111'.

In this case, the data concealment unit 116 may change to inverse bit values the last three bit values in a bitstream constituting pixels values of pixels included in the first pixel group 231 with respect to image block 1 221, change to the inverse bit values the last three bit values in the bitstream constituting the pixel values of the pixels included in the first pixel group 231 with respect to image block 2 222, change to the inverse bit values the last three bit values in the bitstream constituting the pixel values of the pixels included in the first pixel group 231 with respect to image block 3 223, and change to inverse bit values the last three bit values in a bitstream constituting pixel values of pixels included in the second pixel group 232 with respect to image block 4 224.

As such, the pixel values of the pixels included in the first pixel group 231 are changed to pixel values different from original pixel values with respect to image block 1 221, and as a result, the data bit value '1' may be concealed on image block 1 221 and when data is recovered afterwards, in the case where it is verified that the pixel values of the pixels included in the first pixel group 231 of image block 1 221 are the changed pixel values, it may be determined that the data bit value '1' is concealed on image block 1 221 through the verification and thereafter, the data bit value '1' may be recovered from image block 1 221.

Similarly thereto, the pixel values of the pixels included in the first pixel group 231 are changed to pixel values different from original pixel values with respect to image block 2 222, and as a result, the data bit value '1' may be concealed on image block 2 222 and when data is recovered afterwards, in the case where it is verified that the pixel values of the pixels included in the first pixel group 231 of image block 2 222 are the changed pixel values, it may be determined that the data bit value '1' is concealed on image block 2 222 through the verification and thereafter, the data bit value '1' may be recovered from image block 2 222.

The pixel values of the pixels included in the first pixel group 231 are changed to pixel values different from original pixel values with respect to image block 3 223, and as a result, the data bit value '1' may be concealed on image block 3 223 and when data is recovered afterwards, in the case where it is verified that the pixel values of the pixels included in the first pixel group 231 of image block 3 223 are the changed pixel values, it may be determined that the data bit value '1' is concealed on image block 3 223 through the verification and thereafter, the data bit value '1' may be recovered from image block 3 223.

The pixel values of the pixels included in the second pixel group 232 are changed to pixel values other than original pixel values with respect to image block 4 224, and as a result, the data bit value '0' may be concealed on image block 4 224 and when data is recovered afterwards, in the case where it is verified that the pixel values of the pixels included in the second pixel group 232 of image block 4 224 are the changed pixel values, it may be determined that the data bit value '0' is concealed on image block 4 224 through the verification and thereafter, the data bit value '0' may be recovered from image block 4 224.

As such, when concealment of the encoding data in one or more image blocks 221, 222, 223, and 224 is completed, the respective bit values of the encoding data are extracted from one or more respective image blocks 221, 222, 223, and 224 afterwards to recover the encoding data and it is verified whether the pixel group selected to conceal the encoding data with respect to one or more image blocks 221, 222, 223, and 224 is the first pixel group 231 or the second pixel group 232 while extracting the respective bit values of the encoding data from one or more respective image blocks 221, 222, 223, and 224 to verify the respective bit values of the encoding data concealed in one or more respective image blocks 221, 222, 223, and 224.

By such a scheme, when recovering the encoding data is completed from one or more respective image blocks 221, 222, 223, and 224, the encoding data is Viterbi-decoded, and as a result, the input data '10' to be concealed on the image 211 may be finally recovered.

According to the exemplary embodiment of the present invention, the image 211 used for data concealment may be an encrypted image generated by applying a predetermined encryption algorithm to an original image and the data concealment apparatus 110 using the error correction code convolution-encodes the input data with respect to the encrypted image and thereafter, conceals the encoding data according to the scheme to further strength security.

According to the exemplary embodiment of the present invention, when generation of the encoding data is completed, the data concealment apparatus 110 using the error correction code data-interleaves the encoding data and thereafter, conceals the encoding data on the image 211 and extracts the encoding data from the image 211 and deinterleaves the extracted encoding data and thereafter, Viterbi-decodes the encoding data afterwards to minimize an error which may occur in recovering the input data from the image 211.

According to the exemplary embodiment of the present invention, the data concealment apparatus 110 using the error correction code may further include an authentication information generating unit 117.

The authentication information generating unit 117 generates authentication information including block division information associated with the dividing method of one or more image blocks 221, 222, 223, and 224, which is performed in the block dividing unit 112, pixel division information associated with a dividing method of the first pixel group 231 and the second pixel group 232, which is performed in the group dividing unit 114, and information on the predetermined pixel value change pattern.

For example, the authentication information generating unit 117 constitutes the block division information associated with the dividing scheme into one or more image blocks 221, 222, 223, and 224 when the block dividing unit 112 generates one or more image blocks 221, 222, 223, and 224 by dividing the image 211 as represented by reference numeral 220 and constitutes the pixel division information associated with the dividing scheme of the pixel group when the group dividing unit 114 divides one or more respective image blocks 221, 222, 223, and 224 into the first pixel group 231 and the second pixel group 232 as represented by reference numeral 230 generates the authentication information including the block division information, the pixel division information, and the information on the predetermined pixel value change pattern used in the data concealment unit 116, and as a result, the authentication information may be used as a predetermined authentication key when the input data is recovered from the image 211 afterwards.

Hereinabove, referring to FIG. 2, the process in which the data concealment apparatus 110 using the error correction code according to the exemplary embodiment of the present invention conceals predetermined data on the image has been described. Hereinafter, referring to FIG. 3, a process in which the data concealment apparatus 110 using the error correction code recovers the input data from the image in which the input data is concealed based on a data recovery command will be described.

According to the exemplary embodiment of the present invention, the data concealment apparatus 110 using the error correction code may further include a concealed image block dividing unit 118, a recovery pixel group dividing unit 119, an inspection group generating unit 120, a fluctuation function value calculating unit 121, and a data recovering unit 122.

Figure 2:
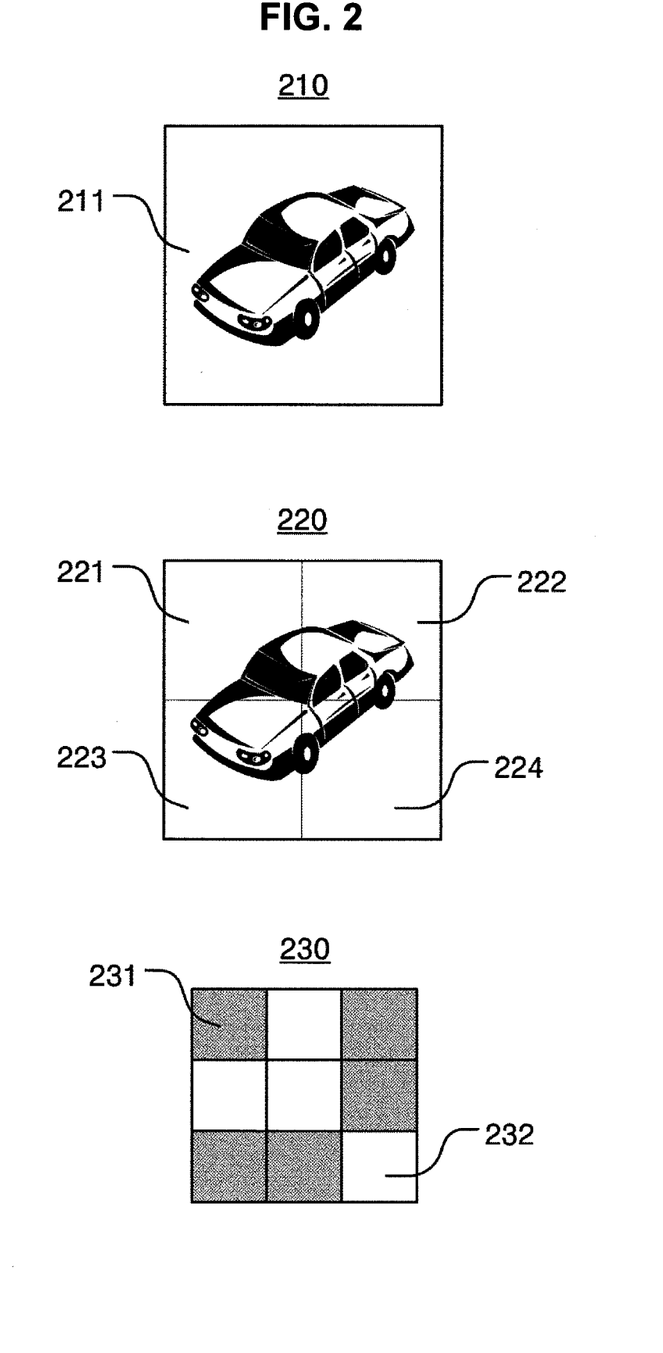
FIG. 2 is a diagram illustrating a process in which a data concealment apparatus using an error correction code conceals input data on an image according to an exemplary embodiment of the present invention.
Figure 3:
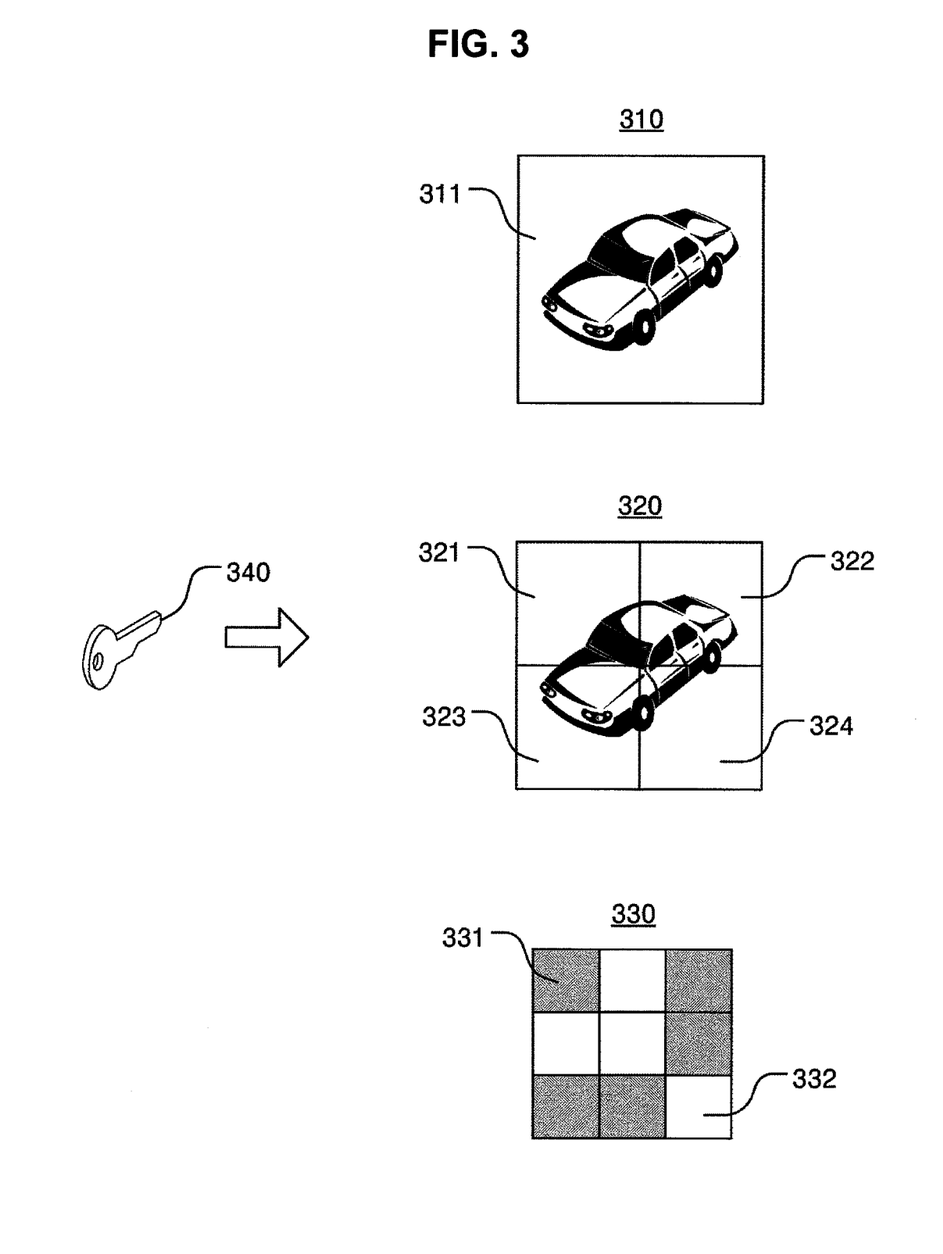
FIG. 3 is a diagram illustrating a process in which a data concealment apparatus using an error correction code recovers input data from an image in which the input data is concealed according to an exemplary embodiment of the present invention.

First, according to the exemplary embodiment described by using FIG. 2, when the input data '10' is concealed on an image 311 as represented by reference numeral 310 and thereafter, a recovery command for the input data '10' concealed in the image 311 is input, the concealed image block dividing unit 118 divides the image 311 into one or more image blocks 321, 322, 323, and 324 as represented by reference numeral 320 according to the block division information included in the authentication information 340 used as a predetermined authentication key.

In this regard, since the block division information is information set so that the image 211 is divided into one or more image blocks 221, 222, 223, and 224 as represented by reference numeral 220 of FIG. 2, the concealed image block dividing unit 118 may divide the image 311 into one or more image blocks 321, 322, 323, and 324 as represented by reference numeral 320.

The recovery pixel group dividing unit 119 divides pixels included in one or more image blocks 321, 322, 323, and 324 into a first pixel group 331 and a second pixel group 322 as represented by reference numeral 330 with respect to one or more respective image blocks 321, 322, 323, and 324 according to the pixel division information included in the authentication information 340.

In this regard, since the pixel division information is the information set so that the pixels processed by the shadow are divided into the first pixel group 231 and the pixels not processed by the shadow are divided into the second pixel group 232 with respect to one or more respective image blocks 221, 222, 223, and 224 as represented by reference numeral 230 of FIG. 2, the recovery pixel group dividing unit 119 may divide the pixels processed by the shadow into the first pixel group 331 and the pixels not processed by the shadow into the second pixel group 332 with respect to one or more respective image blocks 321, 322, 323, and 324 according to the pixel division information as represented by reference numeral 330.

As such, when dividing into the pixels into the first pixel group 331 and the second pixel group 332 is completed, the inspection group generating unit 120 generates a first inspection group in which pixel values of pixels included in the first pixel group 331 are changed according a pixel value recovery pattern corresponding to the predetermined pixel value change pattern included in the authentication information 340 and a second inspection group in which pixel values of pixels included in the second pixel group 332 are changed according to the pixel value recovery pattern with respect to one or more respective image blocks 321, 322, 323, and 324.

Hereinabove, since it is assumed that the predetermined pixel value change pattern is the pattern that converts into the inverse values last three bit values in the data bitstream of the specific pixel value, it may be assumed that the pixel value recovery pattern is a pattern that reconverts into inverse values the last three bit values in the data bitstream of the specific pixel value to correspond to the predetermined pixel value change pattern. For example, in the case where the data bitstream of the specific pixel value is '11110000', when the pixel value is changed by applying the pixel value recovery pattern to the specific pixel value, the data bitstream of the specific pixel value may be changed to '11110111'.

By such a scheme, the inspection group generating unit 120 may generate a first inspection group by changing the pixels values for the pixels included in the first pixel group 331 according to the pixel value recovery pattern, generate a second inspection group by changing the pixels values for the pixels included in the second pixel group 332 according to the pixel value recovery pattern with respect to image block 1 321, generate the first inspection group and the second inspection group even with respect to image block 2 322, and generate the first inspection group and the second inspection group even with respect to image block 3 323 and image block 4 324.

As such, when generation of the first inspection group and the second inspection group is completed with respect to one or more respective image blocks 321, 322, 323, and 324, the fluctuation function value calculating unit 121 may calculate a first fluctuation function value for verifying a spatial correlation among the pixels included in the first inspection group and adjacent pixels and a second fluctuation function value for verifying a spatial correlation among the pixels included in the second inspection group and adjacent pixels, with respect to one or more respective image blocks 321, 322, 323, and 324.

Herein, the spatial correlation means a correlation between a pixel value of a specific pixel and pixels values of pixels positioned adjacent to the specific pixel and when a difference between the pixel value of the specific pixel and the pixels values of the pixels positioned adjacent to the specific pixel is large, it may be regarded that the spatial correlation of the specific pixel is low and when the difference between the pixel value of a specific pixel and the pixels values of the pixels positioned adjacent to the specific pixel is small, it may be regarded that the spatial correlation is high.

The high spatial correlation may mean that the specific pixel is not almost distorted when a distortion degree for the specific pixel is measured in that the specific pixel and the pixels positioned adjacent thereto have similar colors and brightness.

On the contrary, the low spatial correlation may mean that the specific pixel is significantly distorted when the distortion degree for the specific pixel is measured in that the specific pixel and the pixels positioned adjacent thereto have different colors and brightness.

Therefore, since it may be regarded that pixels included in an inspection group having the high spatial correlation with the adjacent pixels between the first inspection group and the second inspection group may have the similar color or brightness to adjacent pixels having original pixel values, it may be regarded that the corresponding pixels are less distorted than pixels included in other inspection groups.

As a result, when the spatial correlation of the first inspection group between the first inspection group and the second inspection group is high in a specific image block among one or more image blocks 321, 322, 323, and 324, a pixel value of the first pixel group 331 is changed according to the pixel value recovery pattern, and as a result, it may be regarded that there is a high probability that the pixel value of the first pixel group 331 will be recovered to the original pixel value. Consequently, it may be estimated that the first pixel group 331 is selected as the pixel group for data concealment with respect to the specific image block while concealing the encoding data.

On the contrary, when the spatial correlation of the second inspection group between the first inspection group and the second inspection group is high in the specific image block among one or more image blocks 321, 322, 323, and 324, a pixel value of the second pixel group 332 is changed according to the pixel value recovery pattern, and as a result, it may be regarded that there is a high probability that the pixel value of the second pixel group 332 will be recovered to the original pixel value. Consequently, it may be estimated that the second pixel group 332 is selected as the pixel group for data concealment with respect to the specific image block while concealing the encoding data.

In this case, the fluctuation function value calculating unit 121 may calculate the first fluctuation function value for verifying the similarity between the pixel values of the pixels included in the first inspection group and the pixel values of the adjacent pixels and calculate the second fluctuation function value for verifying the similarity between the pixel values of the pixels included in the second inspection group and the pixel values of the adjacent pixels, in order to compare the spatial correlations of the first inspection group and the second inspection group.

Herein, the calculation of the first fluctuation function value and the second fluctuation function value may be performed based on Equation 1 given below.

$$f = \sum_{u=2}^{s-1} \sum_{v=2}^{s-1} \left| p_{u,v} - \frac{p_{u-1,v} + p_{u,v-1} + p_{u+1,v} + p_{u,v+1}}{4} \right|$$

[Equation 1]

Herein, f represents a fluctuation function, $p_{u,v}$ represents a pixel value of a pixel positioned on a (u, v) coordinate among the pixels included in the first inspection group or the second inspection group for one or more respective image blocks 321, 322, 323, and 324, and s represents the number of pixels included in the first inspection group or the second inspection group for one or more respective image blocks 321, 322, 323, and 324.

Since the first fluctuation function value and the second fluctuation function value based on Equation 1 are functions to calculate differences between the pixel values of the pixels included in the first inspection group or the second inspection group and the pixel values of the adjacent pixels, when the fluctuation function value is small, it may be regarded that the spatial correlation is high and when the fluctuation function value is large, it may be regarded that the spatial correlation is low.

As such, when calculation of the first fluctuation function value and the second fluctuation function value based on Equation 1 is completed, the data concealment apparatus 110 using the error correction code may verify the inspection group having the higher spatial correlation between the first inspection group and the second inspection group with respect to one or more respective image blocks 321, 322, 323, and 324 by comparing the first fluctuation function value and the second fluctuation function value and thereafter, decide the bit value of the encoding data concealed through the pixel group corresponding to the inspection group having the higher spatial correlation and when the bit value of the encoding data is decided as such, Viterbi-decode the encoding data to recover the input data.

For example, when the spatial correlation of the first inspection group is higher with respect to image block 1 321 among one or more image blocks 321, 322, 323, and 324, the data concealment apparatus 110 using the error correction code determines that the encoding data is concealed through the first pixel group 331 to recover data '1', when the spatial correlation of the first inspection group is higher with respect to image block 2 322, the data concealment apparatus 110 using the error correction code determines that the encoding data is concealed through the first pixel group 331 to recover data '1', when the spatial correlation of the first inspection group is higher with respect to image block 3 323, the data concealment apparatus 110 using the error correction code determines that the encoding data is concealed through the first pixel group 331 to recover data '1', and when the spatial correlation of the second inspection group is higher with respect to image block 4 324, the data concealment apparatus 110 using the error correction code determines that the encoding data is concealed through the second pixel group 332 to recover data '0'.

By such a scheme, when the encoding data '1110' is recovered, the data concealment apparatus 110 using the error correction code calculates the branch metric for Viterbi-decoding based on the encoding data '1110' to finally recover the input data '10'.

However, a scheme that decides the encoding data by the scheme that selects the inspection group having the higher spatial correlation by just comparing the spatial correlations of the first inspection group and the second inspection group corresponds to the hard decision scheme during the Viterbi-decoding and such a scheme has a high probability that the error will occur while recovering the encoding data.

For example, although the pixel values of the pixels included in the first pixel group 331 are changed according to the predetermined pixel value change pattern with respect to image block 1 321, and as a result, the bit value '1' is concealed, the pixel group is selected through the spatial correlation while recovering the data. Consequently, the second pixel group 332 is selected, and as a result, an error that the data bit value '0' is selected as a recovery value for the encoding data from image block 1 321 may occur.

Accordingly, when the hard decision scheme that decides '0' or '1' as the encoding data through the comparison of the spatial correlations is not used, but a soft decision scheme adopting a probabilistic concept regarding whether a probability that the encoding data concealed in each of one or more image blocks 321, 322, 323, and 324 will be '0' is high or a probability that the encoding data will be '1' is high by considering the difference in spatial correlation between the first inspection group and the second inspection group is used, an error which may occur in recovering the input data '10' from the image 311 may be minimized.

In this regard, when calculation of the first fluctuation function value and the second fluctuation function value is completed with respect to one or more image blocks 321, 322, 323, and 324, the data recovering unit 122 decides soft decision data for extracting the encoding data concealed in one or more respective image blocks 321, 322, 323, and 324 based on the difference in size between the first fluctuation function value and the second fluctuation function value and thereafter, performs the Viterbi-decoding based on the soft decision data determined from one or more respective image blocks 321, 322, 323, and 324 with respect to one or more respective image blocks 321, 322, 323, and 324 to recover the input data.

In this case, according to the exemplary embodiment of the present invention, the data recovering unit 122 may include a first mapping table keeping unit 123, a second mapping table keeping unit 124, a soft decision data deciding unit 125, and a Viterbi decoding unit 126.

The first mapping table keeping unit 123 keeps a first mapping table in which different first soft decision data of predetermined bit numbers according to a change in size regarding the difference between the first fluctuation function value and the second fluctuation function value are recorded by assuming that the first fluctuation function value is larger than the second fluctuation function value.

The second mapping table keeping unit 124 keeps a second mapping table in which different second soft decision data of predetermined bit numbers according to the change in size regarding the difference between the second fluctuation function value and the first fluctuation function value are recorded by assuming that the second fluctuation function value is larger than the first fluctuation function value.

Figure 4:
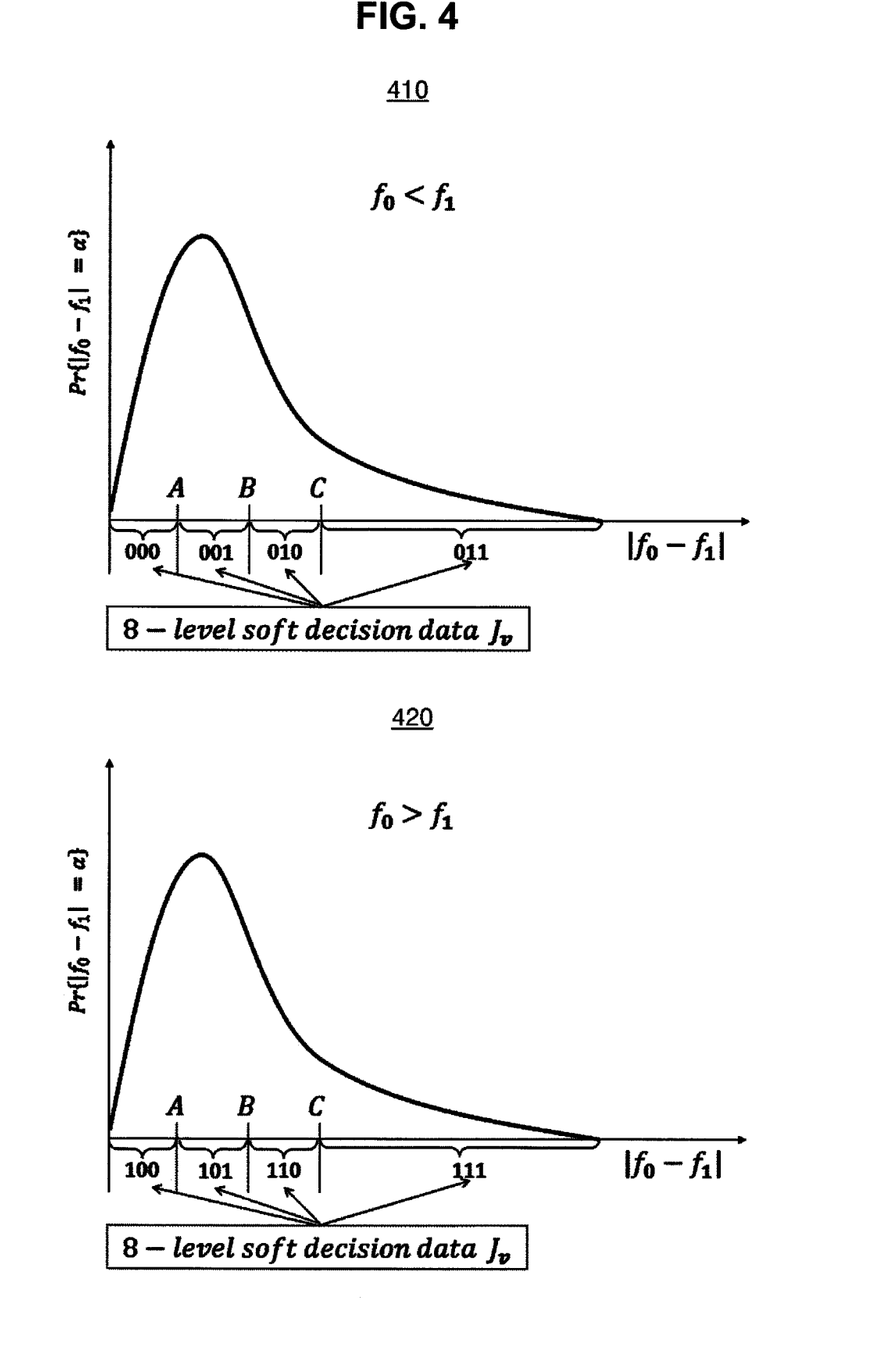
FIG. 4 is a diagram illustrating a process in which a data concealment apparatus using an error correction code determines soft decision data for extracting encoding data concealed in each of one or more image blocks by using a first mapping table and a second mapping table according to an exemplary embodiment of the present invention.

In this regard, in FIG. 4, a diagram for describing the first mapping table and the second mapping table is illustrated.

First, reference numeral 410 represents an example of the first mapping table in which different first soft decision data of 3 bits according to a change in size regarding the difference between the first fluctuation function value '$f_1$' and the second fluctuation function value '$f_0$' are recorded by assuming that the first fluctuation function value '$f_1$' is larger than the second fluctuation function value '$f_0$'.

As represented by reference numeral 410, when the first fluctuation value '$f_1$' is larger than the second fluctuation value '$f_0$', since the probability that the encoding data will be concealed through the change in pixel value of the second pixel group 332 is high, the first soft decision data may be mapped to a value close to '0' from '000' to '011' according to a change in size of the difference between the first fluctuation value '$f_1$' and the second fluctuation value '$f_0$'.

Reference numeral 420 represents an example of the second mapping table in which different second soft decision data of 3 bits according to a change in size regarding the difference between the second fluctuation function value '$f_0$' and the first fluctuation function value '$f_1$' are recorded by assuming that the second fluctuation function value '$f_0$' is larger than the first fluctuation function value '$f_1$'.

As represented by reference numeral 420, when the second fluctuation value '$f_0$' is larger than the first fluctuation value '$f_1$', since the probability that the encoding data will be concealed through the change in pixel value of the first pixel group 331 is high, the second soft decision data may be mapped to a value close to '1' from '100' to '111' according to a change in size of the difference between the second fluctuation value '$f_0$' and the first fluctuation value '$f_1$'.

The soft decision data deciding unit 125 may compare the sizes of the first fluctuation function value and the second fluctuation function value, calculate the difference value between the first fluctuation function value and the second fluctuation function value based on a comparison result in size between the first fluctuation function value and the second fluctuation function value, and decide the soft decision data for extracting the encoding data which are concealed in one or more image blocks 321, 322, 323, and 324 by referring to the first mapping table or the second mapping table based the comparison result in size between the first fluctuation function value and the second fluctuation function value and the calculated difference value, with respect to one or more image blocks 321, 322, 323, and 324.

The Viterbi decoding unit 126 may recover the input data by performing Viterbi-decoding based on the soft decision data decided from one or more image blocks 321, 322, 323, and 324.

For example, in a situation in which the mapping table illustrated in FIG. 4 is present, when the second fluctuation function value '$f_0$' is calculated as the value larger than the first fluctuation function value '$f_1$' with respect to image block 1 321 among one or more image blocks 321, 322, 323, and 324 and the difference value between the second fluctuation function value '$f_0$' and the first fluctuation function value '$f_1$' is positioned at an interval of A to B of reference numeral 420, the soft decision data deciding unit 125 may decide '101' as the soft decision data for the encoding data concealed in image block 1 321, when the second fluctuation function value '$f_0$' is calculated as the value larger than the first fluctuation function value '$f_1$' with respect to image block 2 322 and the difference value between the second fluctuation function value '$f_0$' and the first fluctuation function value '$f_1$' is positioned at an interval of B to C of reference numeral 420, the soft decision data deciding unit 125 may decide '110' as the soft decision data for the encoding data concealed in image block 2 322, when the second fluctuation function value '$f_0$' is calculated as the value larger than the first fluctuation function value '$f_1$' with respect to image block 3 323 and the difference value between the second fluctuation function value '$f_0$' and the first fluctuation function value '$f_1$' is positioned at an interval of A to B of reference numeral 420, the soft decision data deciding unit 125 may decide '101' as the soft decision data for the encoding data concealed in image block 3 323, and when the first fluctuation function value '$f_1$' is calculated as the value larger than the second fluctuation function value '$f_0$' with respect to image block 4 324 and the difference value between the first fluctuation function value '$f_1$' and the second fluctuation function value '$f_0$' is positioned at the interval of A to B of reference numeral 410, the soft decision data deciding unit 125 may decide '001' as the soft decision data for the encoding data concealed in image block 4 324.

As such, when the soft decision data for the encoding data concealed in one or more image blocks 321, 322, 323, and 324, respectively are decided as '101', '110', '101', and '001', the Viterbi decoding unit 126 calculates branch metric based on the soft decision data '101', '110', '101', and '001' to recover '10' which is the original input data concealed on the image 211.

In this case, the Viterbi decoding unit 126 may calculate the branch metric based on Equation 2 given below.

$$00 \Rightarrow BM_0(t)=(2^x-1-J_2)+(2^x-1-J_1)$$

$$01 \Rightarrow BM_1(t)=(2^x-1-J_2)+J_1$$

$$10 \Rightarrow BM_2(t)=J_2+(2^x-1-J_1)$$

$$11 \Rightarrow BM_3(t)=J_2+J_1 \quad \text{[Equation 2]}$$

Herein, Equation 2 relates to an equation for calculating the branch metric when 3-bit soft decision is performed with respect to data subjected to convolution encoding of which rate is ½ and 3 is input in x and $J_1$, $J_2$, and $J_3$ mean each data value of the soft decision data.

Hereinabove, referring to FIG. 3, the process in which the data concealment apparatus 110 using the error correction code recovers the input data from the image 311 has been described. According to an exemplary embodiment of the present invention, the data concealment apparatus 110 using the error correction code includes both the component for concealing the data on the image and the component for recovering the data from the image to perform both data concealment and recovery.

In this regard, when the data concealment apparatus 110 using the error correction code receives a specific image and specific data from a predetermined client terminal together with a data concealment request, the data concealment apparatus 110 may generate a concealment image by concealing the data in the image and thereafter, transmit the concealment image to the client terminal and when the data concealment apparatus 110 receives a data recovery request from the client terminal or another client terminal afterwards, the data concealment apparatus 110 may be configured to recover the data from the concealment image and transmit the recovered data to the client terminal.

According to another exemplary embodiment of the present invention, the data concealment apparatus 110 using the error correction code may conceal the data on a predetermined image and thereafter, transmit the image to a predetermined information receiving terminal and the information receiving terminal may be configured to receive the image and recover the data from the image.

In this regard, according to the exemplary embodiment of the present invention, the data concealment apparatus 110 using the error correction code may further include an information transmitting unit 127.

When the input data is concealed in the image, the information transmitting unit 127 transmits the image in which the input data is concealed and the authentication information to an information receiving terminal (not illustrated).

In this case, the information receiving terminal may recover the input data from the image in a process which is the same as the process in which the data concealment apparatus 110 using the error correction code recovers the input data, which is described by using FIG. 3 based on the authentication information.

Figure 5:
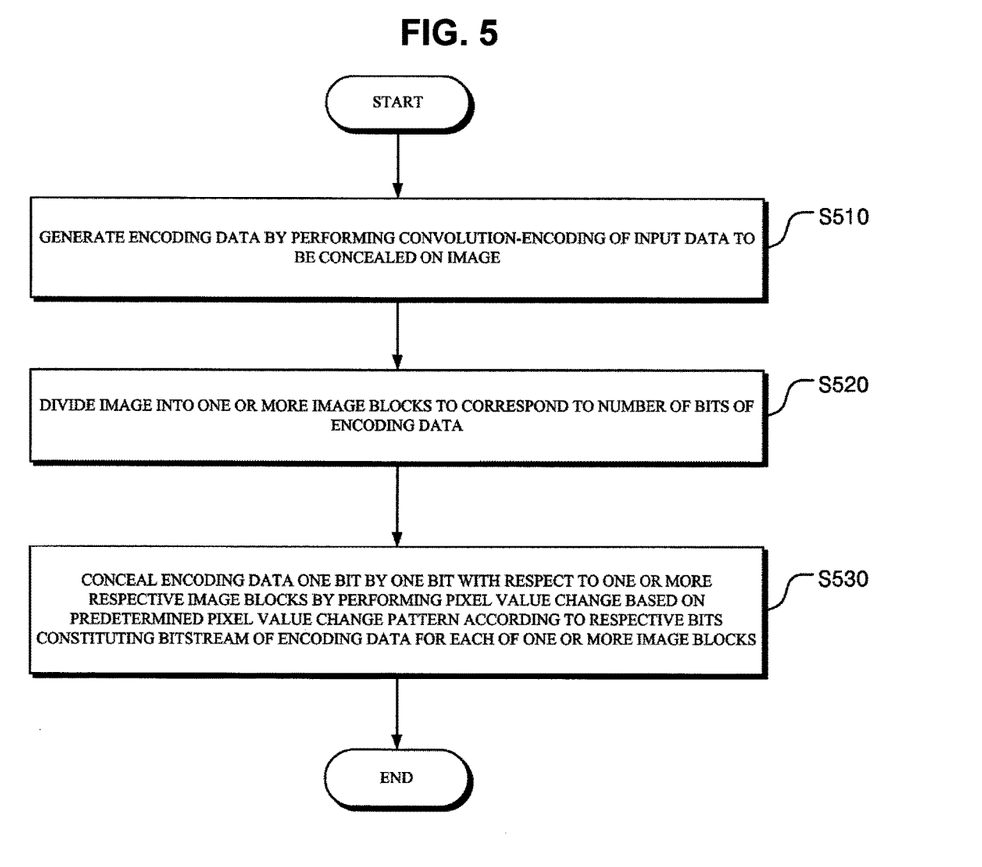
FIG. 5 is a flowchart illustrating a data concealment method using an error correction code according to another exemplary embodiment of the present invention.

FIG. 5 is a flowchart illustrating a data concealment method using an error correction code according to another exemplary embodiment of the present invention.

In step S510, input data to be concealed on an image is convolution-encoded to generate encoding data.

In step S520, the image is divided into one or more image blocks to correspond to the number of bits of the encoding data.

In step S530, a change of a pixel value based on a predetermined pixel value change pattern according to respective bit values constituting a bitstream of the encoding data is performed for each of one or more image blocks to conceal the encoding data for one or more respective image blocks one bit by one bit.

In this case, according to the exemplary embodiment of the present invention, the data concealment method using the error correction code may include dividing the pixels included in one or more image blocks into a first pixel group and a second pixel group with respect to one or more image blocks, selecting a pixel group to be used for data concealment between the first pixel group and the second pixel group with respect to one or more respective image blocks based on a bit value of the encoding data to be concealed in one or more respective image blocks, and concealing the encoding data one bit by one bit for one or more respective image blocks by changing pixel values of pixels included in the selected pixel group with respect to one or more image blocks according to the predetermined pixel value change pattern in step S530.

In this case, according to the exemplary embodiment of the present invention, the predetermined pixel value change pattern may be a pattern that converts into an inverse value at least one bit value which exists at a selected location in a bitstream constituting pixel values of pixels included in the selected pixel group.

According to the exemplary embodiment of the present invention, the data concealment method using the error correction code may further include generating authentication information including block division information associated with a dividing method of one or more image blocks, pixel division information associated with a dividing method of the first pixel group and the second pixel group, and information on the predetermined pixel value change pattern after step S530.

In this case, according to the exemplary embodiment of the present invention, the data concealment method using the error correction code may further include dividing the image into one or more image blocks according to the block division information included in the authentication information when a recovery command for the input data concealed in the image is input after the input data is concealed in the image, dividing the pixels included in one or more respective image blocks into the first pixel group and the second pixel group with respect to one or more respective image blocks according to the pixel division information included in the authentication information, generating a first inspection group in which the pixel values of the pixels included in the first pixel group are changed according to a pixel value recovery pattern corresponding to the predetermined pixel value change pattern included in the authentication information and generating a second inspection group in which pixel values of pixels included in the second pixel group are changed according to the pixel value recovery pattern, with respect to one or more respective image blocks, calculating a first fluctuation function value for verifying spatial correlations between the pixels included in the first inspection group and adjacent pixels and calculating a second fluctuation function value for verifying spatial correlations between the pixels included in the second inspection group and adjacent pixels, with respect to one or more respective image blocks, and deciding soft decision data for extracting the encoding data concealed in one or more respective image blocks based on a difference in size between the first fluctuation function value and the second fluctuation function value and thereafter, recovering the input data by Viterbi-decoding based on the soft decision data decided from one or more respective image blocks, with respect to one or more respective image blocks.

In this case, according to the exemplary embodiment of the present invention, the recovering may include: keeping a first mapping table in which different first soft decision data of predetermined bit numbers according to a change in size regarding the difference between the first fluctuation function value and the second fluctuation function value by assuming that the first fluctuation function value is larger than the second fluctuation function value, keeping a second mapping table in which different second soft decision data of predetermined bit numbers according to a change in size regarding the difference between the second fluctuation function value and the first fluctuation function value by assuming that the second fluctuation function value is larger than the first fluctuation function value, comparing the sizes of the first fluctuation function value and the second fluctuation function value, calculating the difference value between the first fluctuation function value and the second fluctuation function value based on a comparison result in size between the first fluctuation function value and the second fluctuation function value, and deciding the soft decision data for extracting the encoding data which are concealed in one or more respective image blocks by referring to the first mapping table or the second mapping table based the comparison result in size between the first fluctuation function value and the second fluctuation function value and the calculated difference value, with respect to one or more respective image blocks, and recovering the input data by performing Viterbi-decoding based on the soft decision data decided from one or more respective image blocks.

According to the exemplary embodiment of the present invention, the data concealment method using the error correction code may further include transmitting the image in which the input data is concealed and the authentication information to an information receiving terminal when the input data is concealed in the image.

In this case, the information receiving terminal recovers the input data from the image based on the authentication information.

Hereinabove the data concealment method using the error correction code according to the exemplary embodiment of the present invention has been described with reference to FIG. 4. Herein, since the data concealment method using the error correction code according to the exemplary embodiment of the present invention may correspond to the constitution of the operation of the data concealment apparatus 110 using the error correction code described with reference to FIGS. 1 to 4, a detailed description thereof will be omitted.

The data concealment method using the error correction code according to the exemplary embodiment of the present invention may be implemented by a computer program stored in a storage medium for executing the method through combination a computer.

Hereinafter, the data concealment method using the error correction code according to the exemplary embodiments of the present invention may be implemented in a program command form executable by various computer means and recorded in a computer readable medium. The computer readable medium may include one or a combination of a program command, a data file, and a data structure. The program command recorded in the medium may be specially designed and configured for the present invention, or may be publicly known to and used by those skilled in the computer software field. An example of the computer readable recording medium includes a magnetic media, such as a hard disk, a floppy disk, and a magnetic tape, an optical media, such as a CD-ROM and a DVD, a magneto-optical media, such as a floptical disk, and a hardware device, such as a ROM, a RAM, a flash memory, and the like specially formed to store and execute a program command. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

The specified matters and limited embodiments and drawings such as specific components in the present invention have been disclosed for illustrative purposes, but are not limited thereto, and those skilled in the art will appreciate that various modifications, additions and substitutions are possible from the disclosure in the art to which the present invention belongs.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A data concealment apparatus using an error correction code, comprising:

a data encoding unit convolution-encoding input data to be concealed on an image to generate encoding data;
a block dividing unit dividing the image into one or more image blocks to correspond to the number of bits of the encoding data;
a concealment unit concealing the encoding data one bit by one bit with respect to one or more respective image blocks by performing a change of a pixel value based on a predetermined pixel value change pattern according to respective bit values constituting a bitstream of the encoding data for each of one or more image blocks,
wherein the concealment unit includes:
    a group dividing unit dividing pixels included in one or more respective image blocks into a first pixel group and a second pixel group with respect to one or more respective image blocks,
    a group selecting unit selecting pixel groups to be used for data concealment between the first pixel group and the second pixel group with respect to one or more respective image blocks based on bit values of the encoding data to be concealed in one or more respective image blocks, and
    a data concealment unit concealing the encoding data one bit by one bit with respect to one or more respective image blocks by changing the pixels values of the pixels included in the selected pixel group with respect to one or more image blocks according to the predetermined pixel value change pattern;
an authentication information generating unit generating authentication information including block division information associated with a dividing method of one or more image blocks, pixel division information associated with a dividing method of the first pixel group and the second pixel group, and information on the predetermined pixel value change pattern;
a concealed image block dividing unit dividing the image into one or more image blocks according to the block division information included in the authentication information when the input data is concealed in the image and thereafter, a recovery command for the input data concealed in the image is input;
a recovery pixel group dividing unit dividing pixels included in one or more respective image blocks into the first pixel group and the second pixel group with respect to one or more respective image blocks according to the pixel division information included in the authentication information;
an inspection group generating unit generating a first inspection group in which the pixel values of the pixels included in the first pixel group are changed according to a pixel value recovery pattern corresponding to the predetermined pixel value change pattern included in the authentication information and a second inspection group in which the pixel values of the pixels included in the second pixel group are changed according to the pixel value recovery pattern, with respect to one or more respective image blocks;
a fluctuation function value calculating unit calculating a first fluctuation function value for verifying spatial correlations between the pixels included in the first inspection group and adjacent pixels and a second fluctuation function value for verifying spatial correlations between the pixels included in the second inspection group and adjacent pixels, with respect to one or more respective image blocks; and a data recovering unit deciding soft decision data for extracting the encoding data concealed in one or more image blocks based on a difference in size between the first fluctuation function value and the second fluctuation function value and thereafter, recovering the input data by Viterbi-decoding based on the software decision data decided from one or more respective image blocks, with respect to one or more respective image blocks.

2. The data concealment apparatus of claim 1, wherein the predetermined pixel value change pattern is a pattern that converts into an inverse value at least one bit value which exists at a predetermined location in a bitstream constituting pixel values of pixels included in the selected pixel group.

3. The data concealment apparatus of claim 1, wherein the data recovering unit includes:
   a first mapping table keeping unit keeping a first mapping table in which different first soft decision data of predetermined bit numbers according to a change in size regarding the difference between the first fluctuation function value and the second fluctuation function value by assuming that the first fluctuation function value is larger than the second fluctuation function value,
   a second mapping table keeping unit keeping a second mapping table in which different second soft decision data of predetermined bit numbers according to a change in size regarding the difference between the second fluctuation function value and the first fluctuation function value by assuming that the second fluctuation function value is larger than the first fluctuation function value,
   a soft decision data deciding unit comparing the sizes of the first fluctuation function value and the second fluctuation function value, calculating the difference value between the first fluctuation function value and the second fluctuation function value based on a comparison result in size between the first fluctuation function value and the second fluctuation function value, and deciding the soft decision data for extracting the encoding data which are concealed in one or more respective image blocks by referring to the first mapping table or the second mapping table based the comparison result in size between the first fluctuation function value and the second fluctuation function value and the calculated difference value, with respect to one or more respective image blocks, and
   a Viterbi decoding unit recovering the input data by performing Viterbi-decoding based on the soft decision data decided from one or more respective image blocks.

4. The data concealment apparatus of claim 1, further comprising:
   an information transmitting unit transmitting the image in which the input data is concealed and the authentication information to an information receiving terminal when the input data is concealed in the image,
   wherein the information receiving terminal recovers the input data from the image based on the authentication information.

5. A data concealment method using an error correction code, comprising:
   convolution-encoding input data to be concealed on an image to generate encoding data;
   dividing the image into one or more image blocks to correspond to the number of bits of the encoding data;
   concealing the encoding data one bit by one bit with respect to one or more respective image blocks by performing a change of a pixel value based on a predetermined pixel value change pattern according to respective bit values constituting a bitstream of the encoding data for each of one or more image blocks,
   wherein the concealing includes:
      dividing the pixels included in one or more image blocks into a first pixel group and a second pixel group with respect to one or more image blocks,
      selecting a pixel group to be used for data concealment between the first pixel group and the second pixel group with respect to one or more respective image blocks based on a bit value of the encoding data to be concealed in one or more respective image blocks, and
      concealing the encoding data one bit by one bit for one or more respective image blocks by changing pixel values of pixels included in the selected pixel group with respect to one or more image blocks according to the predetermined pixel value change pattern;
   generating authentication information including block division information associated with a dividing method of one or more image blocks, pixel division information associated with a dividing method of the first pixel group and the second pixel group, and information on the predetermined pixel value change pattern;
   dividing the image into one or more image blocks according to the block division information included in the authentication information when a recovery command for the input data concealed in the image is input after the input data is concealed in the image;
   dividing pixels included in one or more respective image blocks into the first pixel group and the second pixel group with respect to one or more respective image blocks according to the pixel division information included in the authentication information;
   generating a first inspection group in which the pixel values of the pixels included in the first pixel group are changed according to a pixel value recovery pattern corresponding to the predetermined pixel value change pattern included in the authentication information and generating a second inspection group in which pixel values of pixels included in the second pixel group are changed according to the pixel value recovery pattern, with respect to one or more respective image blocks;
   calculating a first fluctuation function value for verifying spatial correlations between the pixels included in the first inspection group and adjacent pixels and calculating a second fluctuation function value for verifying spatial correlations between the pixels included in the second inspection group and adjacent pixels, with respect to one or more respective image blocks; and
   deciding soft decision data for extracting the encoding data concealed in one or more respective image blocks based on a difference in size between the first fluctuation function value and the second fluctuation function value and thereafter, recovering the input data by Viterbi-decoding based on the soft decision data decided from one or more respective image blocks, with respect to one or more respective image blocks.

6. The data concealment method of claim 5, wherein the predetermined pixel value change pattern is a pattern that converts into an inverse value at least one bit value which exists at a predetermined location in a bitstream constituting pixel values of pixels included in the selected pixel group.

7. The data concealment method of claim 5, wherein the recovering includes:
- keeping a first mapping table in which different first soft decision data of predetermined bit numbers according to a change in size regarding the difference between the first fluctuation function value and the second fluctuation function value by assuming that the first fluctuation function value is larger than the second fluctuation function value,
- keeping a second mapping table in which different second soft decision data of predetermined bit numbers according to a change in size regarding the difference between the second fluctuation function value and the first fluctuation function value by assuming that the second fluctuation function value is larger than the first fluctuation function value,
- comparing the sizes of the first fluctuation function value and the second fluctuation function value, calculating the difference value between the first fluctuation function value and the second fluctuation function value based on a comparison result in size between the first fluctuation function value and the second fluctuation function value, and deciding the soft decision data for extracting the encoding data which are concealed in one or more respective image blocks by referring to the first mapping table or the second mapping table based the comparison result in size between the first fluctuation function value and the second fluctuation function value and the calculated difference value, with respect to one or more respective image blocks, and
- recovering the input data by performing Viterbi-decoding based on the soft decision data decided from one or more respective image blocks.

8. The data concealment method of claim 5, further comprising:
- transmitting the image in which the input data is concealed and the authentication information to an information receiving terminal when the input data is concealed in the image,
- wherein the information receiving terminal recovers the input data from the image based on the authentication information.

* * * * *